United States Patent
Morita et al.

(10) Patent No.: US 7,215,853 B2
(45) Date of Patent: May 8, 2007

(54) OPTICAL MODULE FORMED ON COMMON SUBSTRATE FOR BRANCHING AN OPTICAL SIGNAL

(75) Inventors: Kiyoshi Morita, Tokyo (JP); Tetsuo Takano, Tokyo (JP); Yoshiatsu Yokoo, Saitama (JP)

(73) Assignee: Hoya Corporation, Tokyo (JP)

( * ) Notice: Subject to any disclaimer, the term of this patent is extended or adjusted under 35 U.S.C. 154(b) by 77 days.

(21) Appl. No.: 10/641,099

(22) Filed: Aug. 15, 2003

(65) Prior Publication Data
US 2004/0101306 A1 May 27, 2004

(30) Foreign Application Priority Data
Aug. 15, 2002 (JP) ............................ P.2002-237019

(51) Int. Cl.
*G02B 6/26* (2006.01)
*G02B 6/42* (2006.01)

(52) U.S. Cl. ............................ 385/47; 385/16; 385/18; 385/20; 385/21; 385/31; 385/39; 385/50

(58) Field of Classification Search .................. 385/47
See application file for complete search history.

(56) References Cited

U.S. PATENT DOCUMENTS

| | | | |
|---|---|---|---|
| 4,991,924 A * | 2/1991 | Shankar et al. ............. 349/196 |
| 5,026,134 A * | 6/1991 | Sugawara et al. ............. 385/51 |
| 5,072,421 A * | 12/1991 | Ono et al. ..................... 365/10 |
| 5,452,312 A * | 9/1995 | Yamamoto et al. ............. 372/5 |
| 5,453,827 A * | 9/1995 | Lee ............................ 356/73.1 |
| 5,537,247 A * | 7/1996 | Xiao .......................... 359/368 |
| 5,800,625 A * | 9/1998 | Engelsberg et al. ............. 134/1 |
| 5,859,717 A * | 1/1999 | Scobey et al. ................ 398/79 |
| 5,943,454 A * | 8/1999 | Aksyuk et al. ............... 385/22 |
| 6,078,710 A * | 6/2000 | Li et al. ........................ 385/39 |
| 6,108,355 A * | 8/2000 | Zorabedian .................. 372/20 |
| 6,118,912 A * | 9/2000 | Xu .............................. 385/24 |
| 6,301,407 B1 * | 10/2001 | Donaldson .................... 385/34 |
| 6,396,233 B1 * | 5/2002 | Christison et al. .......... 318/625 |
| 6,407,838 B1 * | 6/2002 | Canoglu et al. ............. 398/101 |
| 6,418,250 B1 * | 7/2002 | Corbosiero et al. ........... 385/24 |
| 6,421,177 B1 * | 7/2002 | Leyva et al. ................. 359/495 |
| 6,453,087 B2 * | 9/2002 | Frish et al. .................... 385/24 |
| 6,711,315 B1 * | 3/2004 | Joseph et al. ................. 385/17 |
| 6,748,133 B2 * | 6/2004 | Liu et al. ...................... 385/24 |
| 6,768,844 B2 * | 7/2004 | Murphy et al. ............... 385/52 |

(Continued)

FOREIGN PATENT DOCUMENTS

JP 10-311905 A 11/1998

(Continued)

*Primary Examiner*—Frank G. Font
*Assistant Examiner*—Ryan Lepisto
(74) *Attorney, Agent, or Firm*—Sughrue Mion, PLLC (57) ABSTRACT

A collimator 111 for an input light, a collimator 112 for an output light, a collimator 113 for a branched light, a collimator 114 for an inserted light and a wavelength selecting filter 115 are provided on a common substrate 130, and mirrors 121 to 124 for correcting an optical path or prisms XXXX to XXXX capable of producing the same advantages are provided on the optical paths between the collimators 111 to 114 and the wavelength selecting filter 115 respectively. By adjusting the mirrors or prisms, the shift of the optical axis between the collimators is corrected.

6 Claims, 8 Drawing Sheets

U.S. PATENT DOCUMENTS

| | | | |
|---|---|---|---|
| 6,868,199 B2 * | 3/2005 | Li et al. .................... 385/21 |
| 6,873,756 B2 * | 3/2005 | Beerling et al. .............. 385/18 |
| 2002/0006247 A1 * | 1/2002 | Vaganov ..................... 385/17 |
| 2002/0031301 A1 * | 3/2002 | Sasaki et al. ................ 385/34 |
| 2002/0061032 A1 * | 5/2002 | Miura et al. .................. 372/4 |
| 2002/0164114 A1 * | 11/2002 | Golub et al. ................. 385/18 |
| 2002/0181102 A1 * | 12/2002 | Leyva et al. ............... 359/495 |
| 2003/0002809 A1 * | 1/2003 | Jian ........................ 385/73 |
| 2003/0185518 A1 * | 10/2003 | Bennett et al. ............... 385/53 |
| 2003/0206688 A1 * | 11/2003 | Hollars et al. ............... 385/24 |
| 2004/0013366 A1 * | 1/2004 | Morris et al. ................ 385/39 |
| 2004/0033014 A1 * | 2/2004 | Sasaki et al. ................ 385/24 |
| 2004/0130764 A1 * | 7/2004 | Stenger et al. .............. 359/223 |
| 2004/0136645 A1 * | 7/2004 | Dingel et al. ................ 385/24 |
| 2004/0212883 A1 * | 10/2004 | Jacobsen ................... 359/487 |
| 2005/0047724 A1 * | 3/2005 | Farr ........................ 385/47 |

FOREIGN PATENT DOCUMENTS

| | | |
|---|---|---|
| JP | 10-511476 A | 11/1998 |
| JP | 11-337765 A | 12/1999 |
| JP | 2000-183816 A | 6/2000 |

* cited by examiner

OPTICAL MODULE FORMED ON COMMON SUBSTRATE FOR BRANCHING AN OPTICAL SIGNAL

BACKGROUND OF THE INVENTION

1. Field of the Invention

The present invention relates to an optical module to be utilized in an optical branching and inserting apparatus for branching a signal light from a trunk line toward a relay station and inserting the signal light transmitted from the relay station to the trunk line in an optical communication field, for example.

2. Description of the Related Art

In an optical communication using wavelength division multiplexing, an optical branching and inserting apparatus disclosed in JP-A-2000-183816 has been known as an apparatus to be used for branching a signal having a specific wavelength into a relay station and inserting the signal having a specific wavelength from the relay station.

Figure 3:
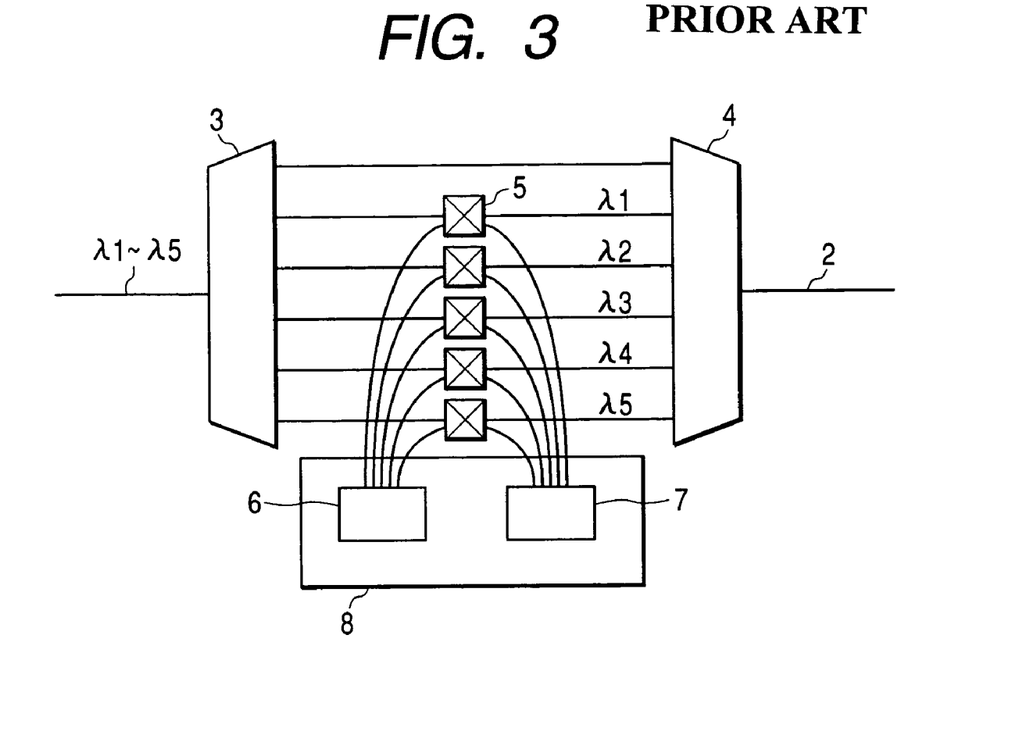
FIG. 3 is a view showing the schematic structure of a conventional light branching and inserting apparatus.

As shown in FIG. 3, the optical branching and inserting apparatus has an optical branching device 3 for branching a wavelength multiplexing light input from a light transmission path 1 for input, and an optical coupling device 4 for coupling lights having respective wavelengths which are once branched and transmitting the lights to an output transmission path 2. The optical branching and inserting apparatus comprises a plurality of optical switches 5 corresponding to optical paths having respective wavelengths which serves to select to branch a light having each wavelength branched by the optical branching device 3 into a receiver 7 of a relay station 8 and to newly insert a signal transmitted by a transmitter 6 of the relay station 8 or to exactly transmit the light having each wavelength branched by the optical branching device 3 to the optical coupling device 4.

In such a branching and inserting apparatus, a filter module having the function of fixing a wavelength selecting filter or a lens onto an emitting optical path from an optical fiber and separating a single wavelength component from a multiple wavelength signal or the function of inserting the single wavelength component into the multiple wavelength signal is often used in the optical branching device 3 or the optical coupling device 4.

Such a filter module has a structure in which collimators including a lens and an optical fiber are provided opposite to each other with a wavelength selecting filter interposed therebetween as described in JP-T-10-511476 and JP-A-10-311905, for example.

In such a filter module, generally, a wavelength selecting filter, a lens and an optical fiber are inserted and fixed into a common cylindrical housing with an optical axis adjusted. Such a module is generally referred to as an Add/Drop Multiplexer (ADM).

Since the optical branching device 3 and the optical coupling device 4 in the optical branching and inserting apparatus of FIG. 3 are to carry out the same coupling or branching for a plurality of wavelengths, they have such a structure that a plurality of filter module units having different wavelength separating characteristics is used and the optical fibers on signal input/output ends thereof are sequentially connected by a method such as fusion. Such a module is generally referred to as "Mux/DeMux". A light to be input to the optical branching device 3 or the optical coupling device 4 sequentially passes through a plurality of filter modules to be branched to have each wavelength or a light having each wavelength is sequentially coupled (for example, see JP-A-11-337765). In general, the single modules connected sequentially are attached to a single case.

In the optical branching and inserting apparatus using the filter module, if the number of channels to be used for an optical communication is increased, it is necessary to correspondingly increase the number of single filter modules to be used. For this reason, the price of a raw material component is equal to or more than a multiple of the price of the single filter module. Moreover, there is provided the step of fusing the optical fiber on the input/output end of the filter module. Therefore, the step is complicated and a cost is increased, and furthermore, a connecting loss is caused by a transverse offset during fusing connection. Furthermore, the single filter module has such a structure as to be fixed into the housing. Consequently, there is a problem in that an unnecessary volume other than functional parts is required and the volumes of necessary components are also increased with an increase in the number of the channels.

In order to eliminate these drawbacks, the inventors tried to reduce the price, size and loss of an optical module in a minimum volume without using unnecessary components by a structure in which an exterior member to be the housing of the filter module is eliminated and the components are fixed onto a single substrate, and a light is spatially propagated between the components.

However, it was found that the shift of an optical axis is generated on a light emitted from each component so that optical coupling cannot be easily carried out and an expected performance cannot be obtained in the case in which the element components in the module are to be actually separated and provided on the substrate.

The factor for the shift of the optical axis can include the following:

the end faces of an optical fiber and a refractive index profile type lens are set to be oblique end faces in order to reduce a reflection loss;

the optical axis is shifted when a light is transmitted through the substrate of a dielectric multilayer film filter to be a wavelength selecting filter;

fabrication can be carried out with precision in the external shape of each component which is equal to or less than precision in a processing required for optically coupling single mode fibers; and fabrication can be carried out with precision in a processing of a substrate to be provided with these components which is equal to or less than precision required for optically coupling the single mode fibers.

The contents will be specifically described. For the optical coupling of the optical fibers, particularly, the single mode fibers, precision in alignment on a submicron level is required because a core diameter is 10 μm or less. In passive optical components such as a fiber pigtail and a lens, a component tolerance and a manufacturing tolerance exceed the same precision. Actually, the fabrication cannot be carried out with the same precision. Even if the fabrication can be individually carried out, moreover, there is a problem in that an emitted light is shifted from the optical axis in a collimator fabricated by a manufacturing method which is a current mainstream.

Figure 4:
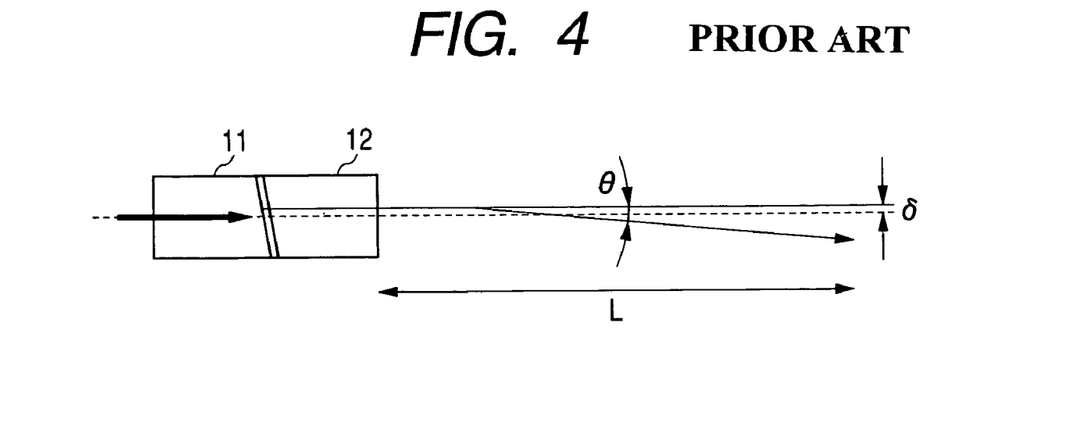
FIG. 4 is an explanatory view showing the shift of an optical axis of a collimator.
Figure 5:
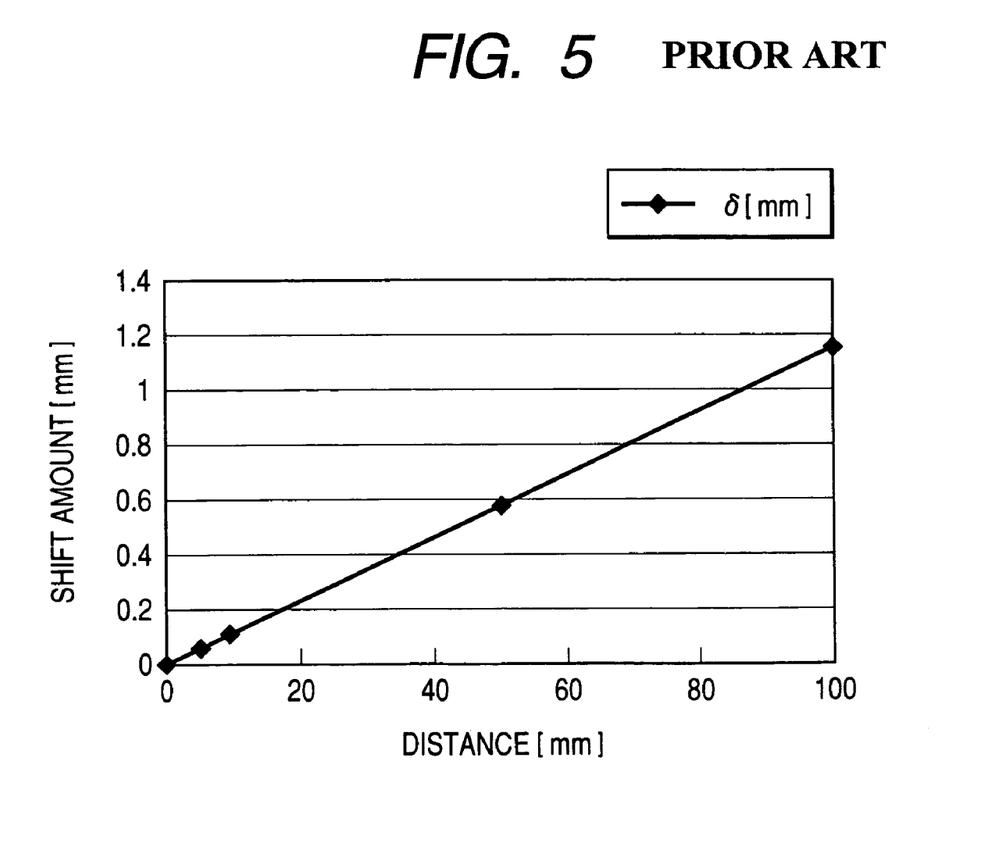
FIG. 5 is a chart showing a characteristic of the shift of an optical axis in the collimator.

FIG. 4 shows a collimator fabricated by the manufacturing method which is the current mainstream, that is, in combination of a fiber pigtail 11 and a refractive index profile lens 12. In order to reduce a reflection loss, an angle of approximately 8 degrees is formed on each of the end faces of the pigtail 11 and the lens 12. Consequently, a position shift $\delta$ and an angle shift $\theta$ are generated on an emitted light as compared with the position of an incident light. In particular, the amount of the shift of the optical axis caused by the angle shift θ is increased if a coupling distance L is increased as shown in FIG. 5. In a collimator pair provided in a V groove on the same straight line, accordingly, the optical coupling is almost zero when a space is several mm or more.

In the case in which the V groove for fixing the collimator onto a substrate is fabricated by grinding, moreover, it is desirable that two V grooves provided with the collimator pair should be formed in parallel with each other at a request of a work. For the above reason, the collimator pair for implementing effective optical coupling cannot be fabricated on the V groove.

Figure 6:
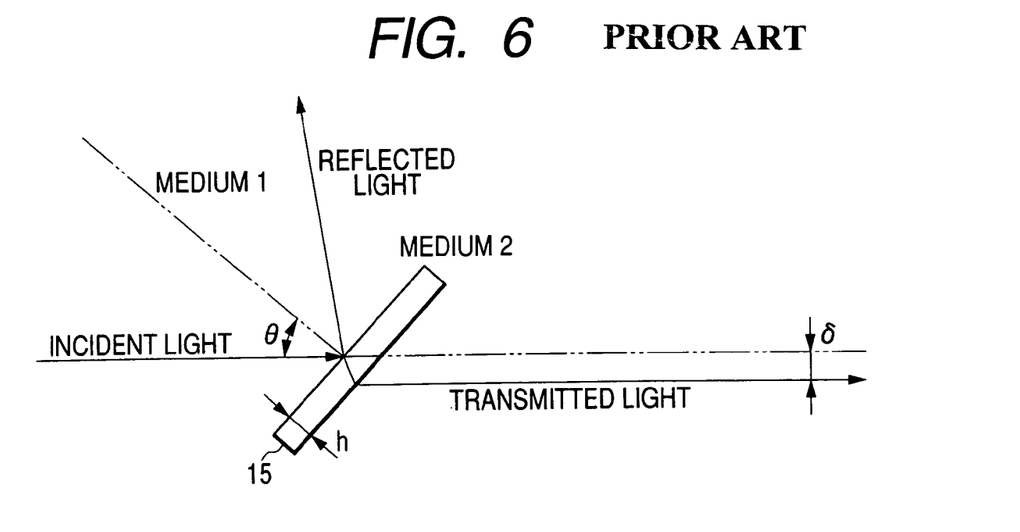
FIG. 6 is an explanatory view showing the shift of an optical axis of a wavelength selecting filter.

Moreover, an interference filter such as a wavelength selecting filter is usually fabricated by forming a film on a glass substrate 15 having a finite thickness as shown in FIG. 6 and has a thickness of approximately 1 mm to avoid a breakdown against a generated film pressure. The parallel positional shift amount δ of a light incident at an angle of incidence θ on a medium 2 having a thickness h and a refractive index n2 from a medium 1 having a refractive index n1 (=a difference between an optical path to be passed when the medium 2 is not present and an actual optical path) can be expressed in the following equation.

$$\delta = h\sin\theta\left[1 - \frac{\cos\theta}{\sqrt{\left(\frac{n_2}{n_1}\right)^2 - \sin^2\theta}}\right] \quad \text{Equation 1}$$

Figure 7:
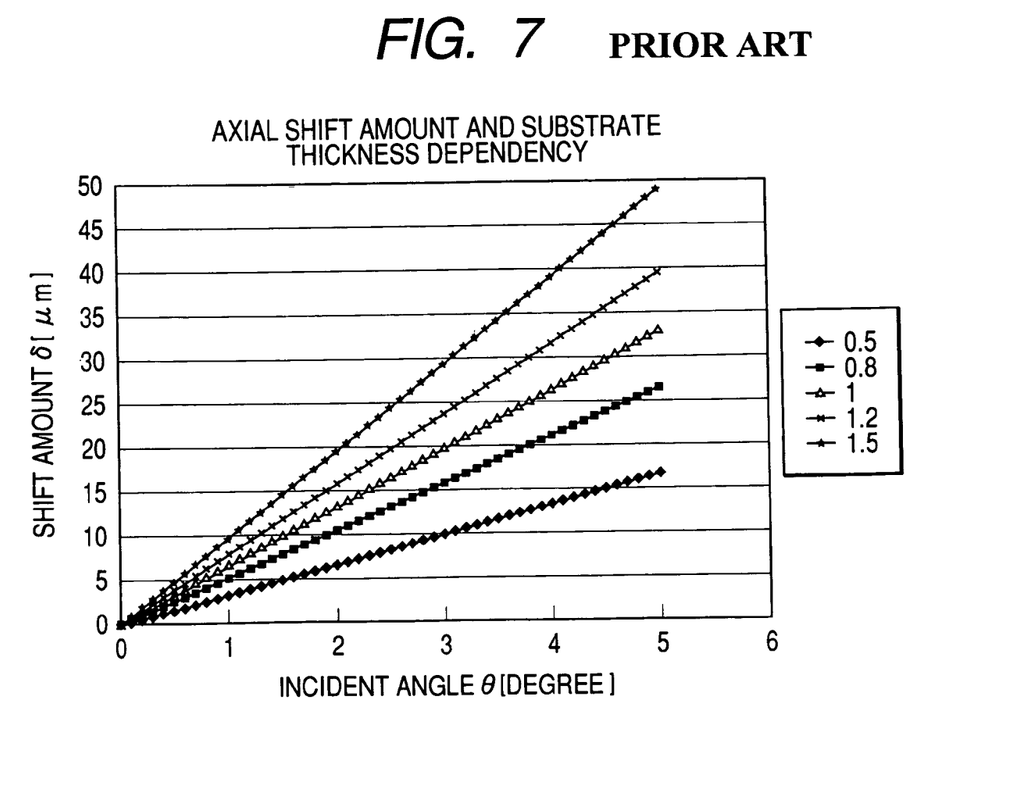
FIG. 7 is a chart showing a characteristic of the shift of the optical axis in the wavelength selecting filter.
Figure 8A:
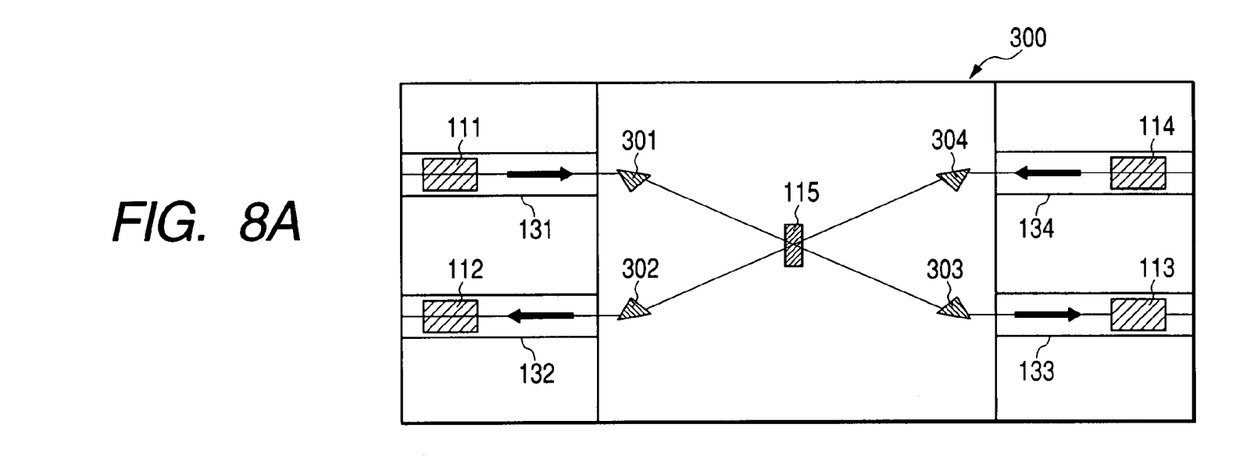
FIGS. 8(a) and 8(b) show the plan views showing an optical module structure according to a third embodiment of the invention.
Figure 8B:
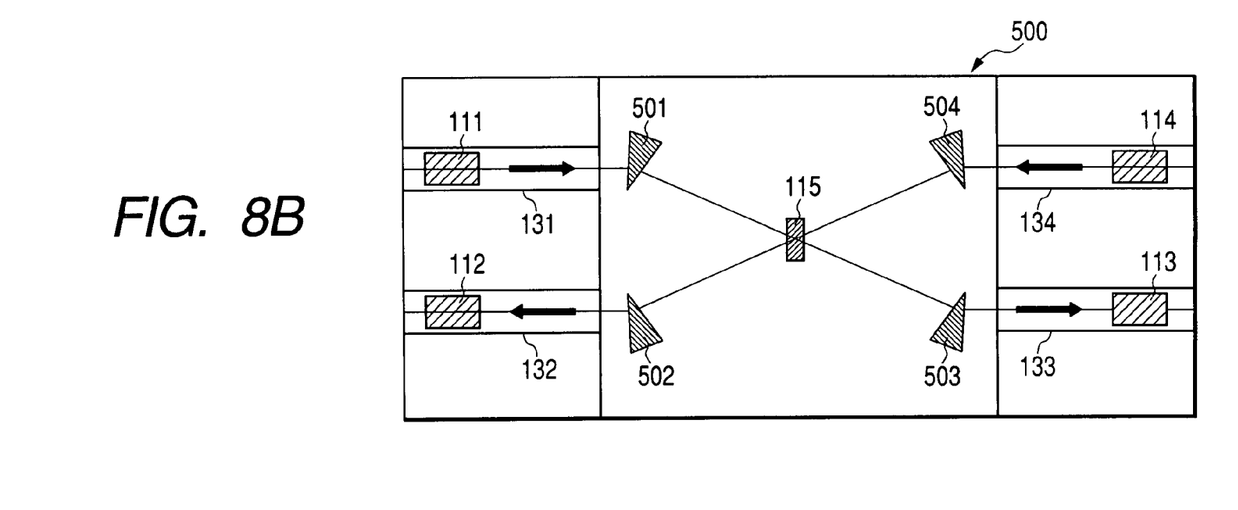
Figure 9A:
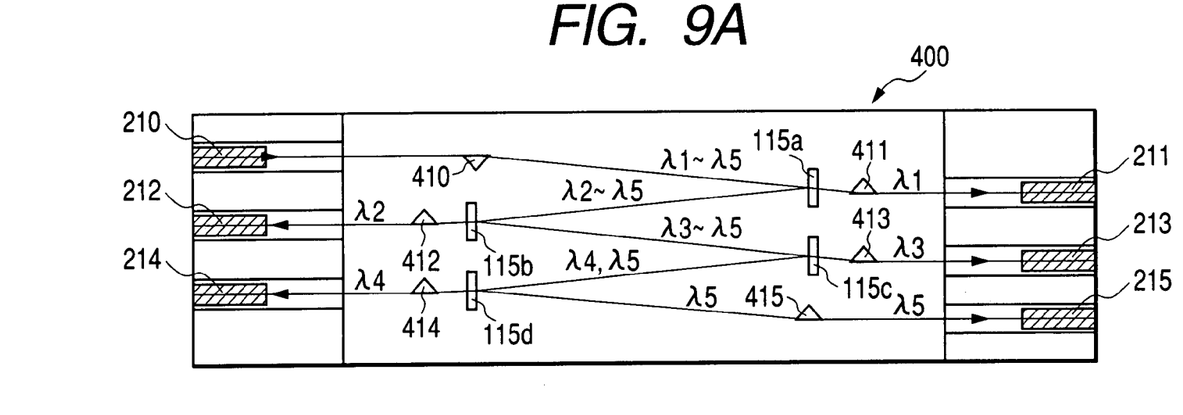
FIGS. 9(a) and 9(b) show the plan views showing an optical module having the total prism according to a third embodiment of the invention: (a) being an explanatory view showing the case in which the optical module is used as an optical branching device; (b) being an explanatory view showing the case in which the optical module is used as an optical coupling device.
Figure 9B:
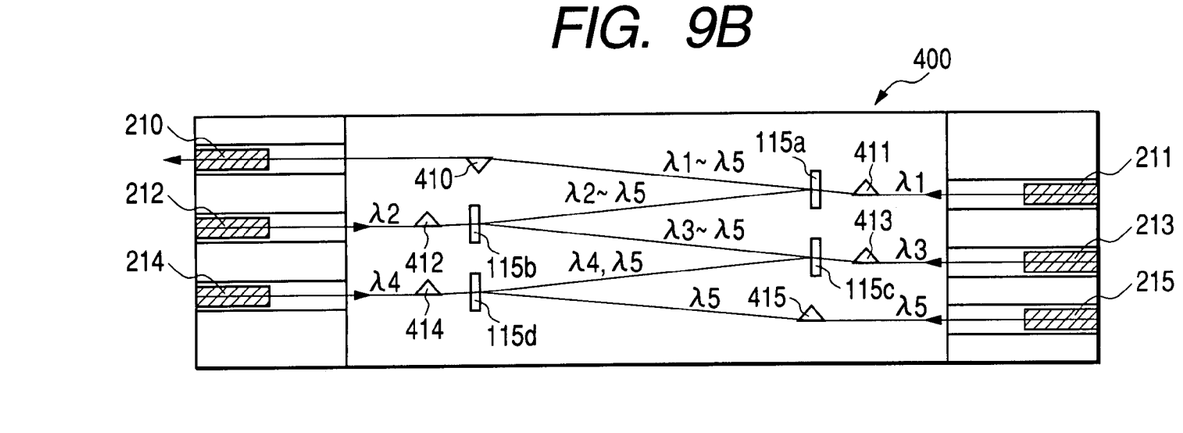
Figure 10A:
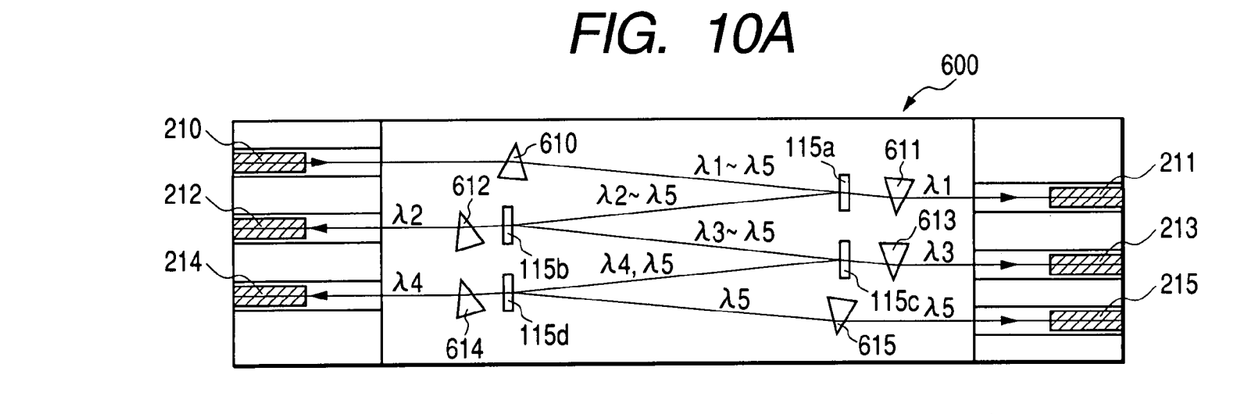
FIGS. 10(a) and 10(b) show the plan views showing an optical module having the wedge-shaped prism according to a third embodiment of the invention: (a) being an explanatory view showing the case in which the optical module is used as an optical branching device; (b) being an explanatory view showing the case in which the optical module is used as an optical coupling device.
Figure 10B:
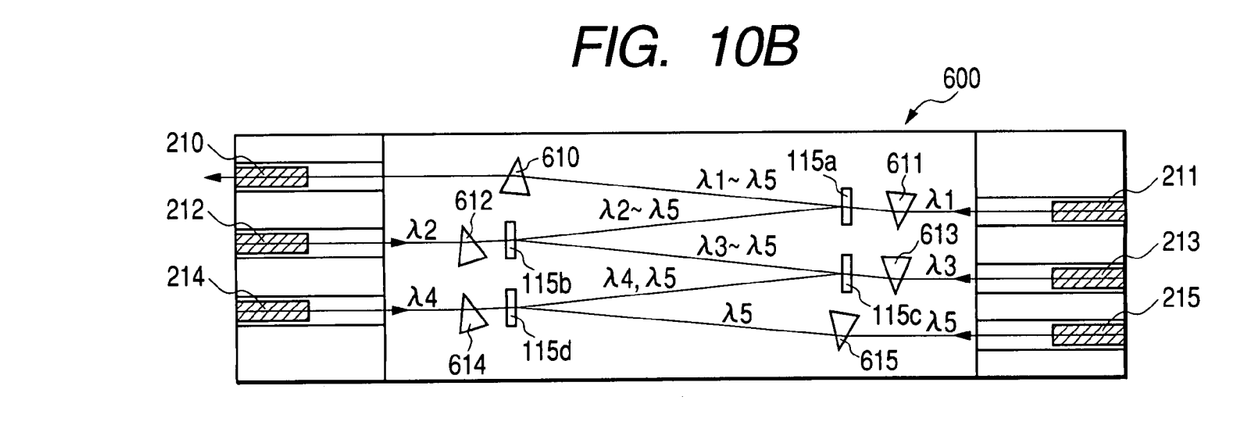

FIG. 7 shows a relationship between the shift amount δ (μm) of the optical axis and the angle of incidence θ (Degree) when a light passes through a substrate having various thicknesses (0.5 to 1.5 mm) as shown in FIG. 6. As shown in FIG. 7, the shift of the optical axis is generated depending on the thickness of the substrate and the angle of incidence. Even if the optical coupling of the collimator pair is previously carried out before the interference filter is inserted, therefore, the optical path is shifted by the simple insertion of the filter so that a loss can be greatly increased or the coupling cannot be carried out.

Even if all the shifts are estimated to carry out a design, furthermore, a processing error and an assembly error of a component and a substrate are generated on each component. In addition, these errors have a level which clearly departs from necessary precision for the optical coupling, which is insignificant.

As described above, there is a problem in that the shift of the optical axis is actually great and sufficient optical coupling cannot be obtained if each component is simply arranged in parallel in each V groove for component fixation which is formed on the same substrate as in a conventional trial.

SUMMARY OF THE INVENTION

The invention has been made in order to solve the problems and has an object to provide an optical module having components such as a collimator and an interference filter arranged on the same substrate in which the shift of an optical axis can easily be corrected and excellent optical coupling can be obtained. Moreover, it is another object of the invention to provide an optical module having a low loss, a small size and a low price which can be utilized as an optical branching device or an optical coupling device to be used in an optical communication field.

A first aspect of the invention is directed to an optical module comprising, on a common substrate, a collimator for an input light which collimates a light input from an outside, a collimator for an output light which collects an incident light to be output to the outside and transmits the light to the outside, an interference filter provided on an optical path from the collimator for an input light to the collimator for an output light, and a mirror for correcting an optical path which is provided on an optical path between the collimator and the interference filter or a prism capable of producing the same advantages as those of the mirror. The mirror and the prism will be hereinafter referred to as components for correcting an optical path.

According to the invention, the component for correcting an optical path is provided on the optical path between each collimator and the interference filter. By adjusting each component for correcting an optical path, therefore, it is possible to easily correct the shift of an optical axis between the collimators. Consequently, excellent optical coupling can be implemented. Moreover, each component is fixed onto the common substrate and a light is spatially propagated between the components. Therefore, unnecessary components are not used so that the price and size of the optical module can be reduced in a minimum volume.

As in a second aspect of the invention, it is possible to use, as the interference filter, at least any of:

(a) a wavelength selecting filter for transmitting only a light in a specific wavelength band in incident lights and reflecting lights having other wavelengths;

(b) a gain equivalent filter for correcting a light intensity to flatten an intensity of an incident light if the intensity is not uniform for a wavelength; and (c) a filter for taking out only a part of an amount of the incident light.

A third aspect of the invention is directed to an optical module comprising a collimator for an input light which collimates a wavelength multiplexing light transmitted from a light transmission path for input into a parallel light, a wavelength selecting filter for transmitting only a light in a specific wavelength band in the wavelength multiplexing lights incident through the collimator for an input light and reflecting lights in other wavelength bands, a collimator for a branched light which collects a light transmitted through the wavelength selecting filter and transmits the light to an external light transmission path for branching, a collimator for an inserted light which collimates a light in a specific wavelength band transmitted from an external light transmission path for insertion into a parallel light and causes the light to be incident on the wavelength selecting filter, a collimator for an output light which collects a synthesized light of a light incident on and transmitted through the wavelength selecting filter by the collimator for an inserted light and any of the wavelength multiplexing lights reflected by the wavelength selecting filter and transmits the collected light to an external light transmission path for output, and a mirror for correcting an optical path which is provided on an optical path between the collimator and the wavelength selecting filter or a prism capable of producing the same advantages as those of the mirror, wherein each of the collimators, the wavelength selecting filter and the component for correcting an optical path are provided on a common substrate.

According to the invention, the mirror or prism for correcting an optical path is provided on the optical path between each collimator and the wavelength selecting filter. By adjusting each mirror or prism, therefore, it is possible to easily correct the shift of an optical axis between the collimators. Consequently, excellent optical coupling can be carried out. Accordingly, it is possible to implement an optical branching and inserting apparatus having a low loss. Moreover, each component is fixed onto a single substrate and a light is spatially propagated between the components. Therefore, unnecessary components are not used so that the price and size of the optical module can be reduced in a minimum volume.

A fourth aspect of the invention is directed to an optical module wherein a plurality of wavelength selecting filters having a branching function of transmitting only a light having a specific wavelength in incident lights and reflecting lights having other wavelengths and a coupling function of coupling a light having a specific wavelength which is incident from one side and is transmitted and a light having another wavelength which is incident from the other side and is reflected is provided with the specific wavelength varied, the wavelength selecting filters are provided in such a manner that a light reflected by the filter is incident in order from an upstream side toward a downstream side in a direction of advance of the light, a collimator is provided on an optical path for a light incident on the wavelength selecting filter at the most upstream, an optical path for a light transmitted through each of the wavelength selecting filters and an optical path for a light reflected by the wavelength selecting filter at the most downstream respectively, a mirror for correcting an optical path is provided on an optical path between each collimator and the wavelength selecting filter, and the collimator, the wavelength selecting filter and the mirror or prism for correcting an optical path are provided on a common substrate.

In the invention, it is possible to sequentially branch and take out lights having different wavelengths from a wavelength multiplexing light or to sequentially couple the lights having different wavelengths, thereby carrying out wavelength multiplexing. In that case, the collimator and the wavelength selecting filter are fixed onto a single substrate and a light is spatially propagated between components. Consequently, unnecessary components are not used so that it is possible to reduce the price and size of the optical module in a minimum volume. Moreover, the mirror for correcting an optical path or the prism capable of producing the same advantages as those of the mirror is provided on the optical path between each collimator and the wavelength selecting filter. By adjusting each component for correcting an optical path, therefore, it is possible to easily correct the shift of an optical axis between the collimators, thereby carrying out excellent optical coupling. Accordingly, it is possible to fabricate a plural wavelength optical branching device and a plural wavelength optical coupling device which have a low loss.

A fifth aspect of the invention is directed to the optical module according to the fourth aspect of the invention, wherein the collimator provided on the most upstream is set to be a collimator for an input light which receives a wavelength multiplexing light from an external light transmission path for input, the other collimators are set to be collimators for a branched light which take out a light transmitted through or reflected by the wavelength selecting filter to an outside, and the wavelength selecting filter is utilized as an optical unit for branching, thereby constituting a plural wavelength optical branching device for sequentially branching the wavelength multiplexing light.

A sixth aspect of the invention is directed to the optical module according to the fourth aspect of the invention, wherein the collimator provided on the most downstream is set to be a collimator for an output light which transmits an output light to an external light transmission path for output, the other collimators are set to be collimators for an inserted light which cause lights having different wavelengths to be incident on the wavelength selecting filter from an outside, and the wavelength selecting filter is utilized as an optical unit for coupling, thereby constituting a plural wavelength optical coupling device for sequentially coupling lights having different wavelengths.

According to the fifth aspect of the invention, the wavelength multiplexing light can be sequentially branched into lights having different wavelengths at a low loss. According to the sixth aspect of the invention, the lights having different wavelengths can be coupled to carry out wavelength multiplexing at a low loss.

A seventh aspect of the invention is directed to the optical module according to any of the first to sixth aspects of the invention, wherein each of the collimators is provided on a V groove formed on a common substrate.

In the invention, each collimator is fixed to the V groove formed on the common substrate. Therefore, assembly can easily be carried out.

An eighth aspect of the invention is directed to the optical module according to the seventh aspect of the invention, wherein each of the collimators is provided on a V groove formed on the common substrate in parallel.

In the invention, each collimator is fixed to the V groove formed on the common substrate in parallel. By adjusting the optical path through the mirror or prism for correcting an optical path, therefore, it is possible to easily correct the shift of the optical axis between the collimators while using the parallel V groove which can easily be processed. Thus, excellent optical coupling can be carried out.

As in a ninth aspect of the invention, it is desirable that the collimator should be constituted by an optical fiber and a collimate lens provided on an emitting or incident end of the optical fiber. As in a tenth aspect of the invention, moreover, it is desirable that a mirror of a Gimbal type should be used as the mirror for correcting an optical path.

In the case in which a prism is to be used as the component for correcting an optical path, it is desirable that a prism of a total reflection type or a vertical angle portion of a wedge-shaped prism having an optional angle should be used.

DESCRIPTION OF THE PREFERRED EMBODIMENTS

Mode for Carrying Out the Invention

Embodiments of the invention will be described below with reference to the drawings.

Figure 1A:
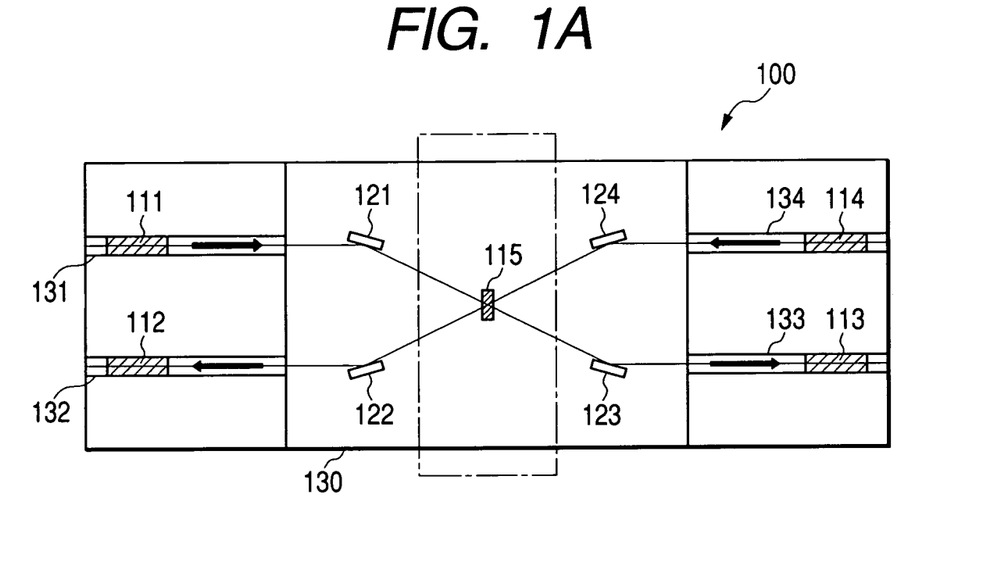
FIGS. 1(a) and 1(b) show the views of the structure of an optical module according to a first embodiment of the invention, (a) being a plan view and (b) being a side view.
Figure 1B:
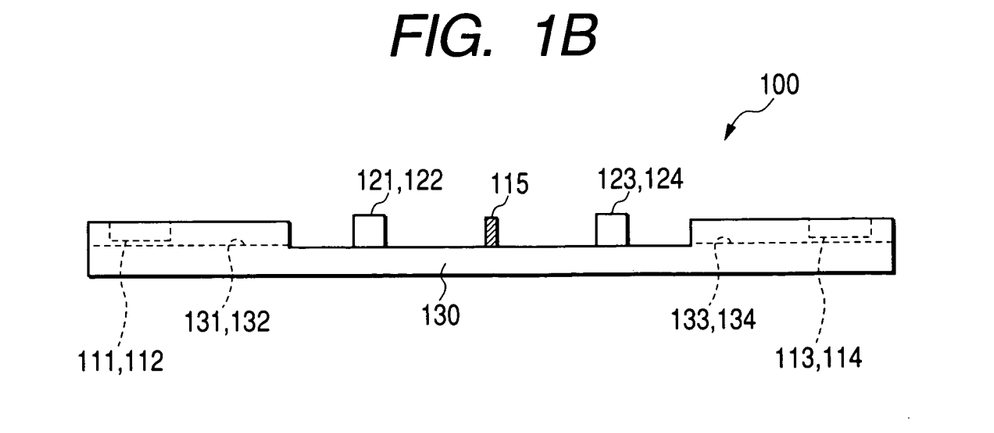

FIG. 1 is a view showing the structure of an optical module 100 according to a first embodiment of the invention. (a) is a plan view and (b) is a side view. The optical module 100 has the function of an optical branching and inserting apparatus (that is, the function of branching a light having a specific wavelength to the outside for a wavelength multiplexing light to be input and of coupling a light having a specific wavelength to be input from the outside to a light which is not branched and outputting the coupled light), and has such a structure that four collimators 111, 112, 113 and 114 and one wavelength selecting filter 115 are provided on a substrate 130 and mirrors 121, 122, 123 and 124 for correcting an optical path are provided between the wavelength selecting filter 115 and the collimators 111, 112, 113 and 114 respectively, thereby spatially propagating a light between components.

The wavelength selecting filter 115 has a branching function of transmitting only a light having a specific wavelength in incident lights and reflecting lights having other wavelengths and a coupling function of coupling a light having a specific wavelength which is incident from one side and is transmitted to a light having another wavelength which is incident from the other side and is reflected. In the wavelength selecting filter 115, an optical multilayer film (for example, a dielectric multilayer film) is formed on a transmitting substrate such as glass or resin and a filter characteristic can be exhibited depending on the material of the optical multilayer film and a layer structure. In general, the optical multilayer film has such a structure that a material having a small refractive index and a material having a great refractive index are alternately provided.

In the optical module 100, the collimator 111 for an input light, the collimator 112 for an output light, the collimator 113 for a branched light and the collimator 114 for an inserted light are provided as the four collimators.

The collimator 111 for an input light serves to collimate a wavelength multiplexing light (an input light) input from a light transmission path for input (a trunk optical fiber) to be spatially transmitted and to cause the same light to be incident on the surface of the wavelength selecting filter 115, the collimator 113 for a branched light serves to collect a light having a specific wavelength which is incident on the surface of the wavelength selecting filter 115 and is transmitted and to cause the same light to be incident on a light transmission path for branching, the collimator 134 for an inserted light serves to collimate a light incident through an external light transmission path for insertion to be spatially transmitted and to cause the same light to be incident on the back face of the wavelength selecting filter 115, and the collimator 112 for an output light serves to collect a light obtained by coupling a light having a specific wavelength input from the outside to the wavelength selecting filter 115 through the collimator 114 for an inserted light to lights having other wavelengths which are reflected by the wavelength selecting filter 115 and to output the same light to a light transmission path for output.

Each of the collimator 111 for an input light, the collimator 112 for an output light, the collimator 113 for a branched light and the collimator 114 for an inserted light which are used in the embodiment is constituted by a collimate lens for optical coupling to an optical fiber and fulfils the function of converting (collimating) the signal light of the optical fiber into a parallel light and emitting the parallel light toward a space, and collecting the parallel light transmitted spatially onto the end face of the optical fiber and causing the same light to be incident.

It is preferable that a rod-shaped lens should be used for the collimate lens in respect of easy handling. Examples of the rod-shaped lens include a refractive index profile type rod-shaped lens and a lens having a spherical or aspheric surface formed on one end of a uniform rod. While the collimator is constituted by an optical fiber and a lens provided on a substrate respectively, the optical fiber and the lens may be previously created in combination and may be provided on the substrate. The latter collimator can be formed by fixing an optical fiber to a holding tool having an equal diameter to the diameter of the collimate lens and inserting and fixing the collimate lens and the holding tool having the optical fiber into a common cylindrical member made of metal such as glass or stainless, for example.

The collimators 111 to 114 are positioned and fixed onto the V grooves 131 to 134 formed in parallel with each other on the same substrate 130, respectively. The first V groove 131 fixing the collimator 111 for an input light and the fourth V groove 134 fixing the collimator 114 for an inserted light are formed through cutting, and the second V groove 132 fixing the collimator 112 for an output light and the third V groove 133 fixing the collimator 113 for a branched light are formed through cutting.

Accordingly, the collimator 111 for an input light and the collimator 112 for an output light are provided adjacently to each other in a close position to one of the sides of the rectangular substrate 130, and the collimator 113 for a branched light and the collimator 114 for an inserted light are provided adjacently to each other in a close position to a side opposite thereto. Moreover, the first V groove 131 and the fourth V groove 134 are formed through cutting. Consequently, the emitting ends of the collimator 111 for an input light and the collimator 114 for an inserted light are opposed to each other, and the incident ends of the collimator 112 for an output light and the collimator 113 for a branched light are opposed to each other. The wavelength selecting filter 115 is provided on almost the center of the substrate 130 so as to be interposed between two pairs of collimators 111, 114, 112 and 113 opposed to each other.

The mirrors 121 and 123 for correcting an optical path are provided on an optical path between the collimator 111 for an input light and the wavelength selecting filter 115 and an optical path between the collimator 113 for a branched light and the wavelength selecting filter 115 in such a manner that a light emitted from the collimator 111 for an input light is incident on the surface (one side) of the wavelength selecting filter 115 at a predetermined angle and a light transmitted through the wavelength selecting filter 115 is incident on the collimator 113 for a branched light, respectively. Moreover, the mirrors 124 and 122 for correcting an optical path are provided on an optical path between the collimator 114 for an inserted light and the wavelength selecting filter 115 and an optical path between the collimator 112 for an output light and the wavelength selecting filter 115 in such a manner that a light emitted from the collimator 114 for an inserted light is incident on the back face (the other side) of the wavelength selecting filter 115 at a predetermined angle and a light obtained by coupling a light emitted from the collimator 114 for an inserted light and transmitted through the wavelength selecting filter 115 to a light emitted from the collimator 111 for an input light and reflected by the surface of the wavelength selecting filter 115 is incident on the collimator 112 for an output light, respectively.

For the substrate 130 to be used for fixing each of the collimators 111 to 114 and the wavelength selecting filter 115, a silicon substrate, a glass substrate, a metal substrate such as aluminum and a plastic substrate which have small coefficients of thermal expansion can be used in order to prevent a positional shift between components after the assembly. Moreover, it is preferable that the substrate 130 should have such a thickness as to obtain a sufficient rigidity. Furthermore, the V grooves 131 to 134 for collimator arrangement to be formed on the substrate 130 can be formed by grinding. In the case in which the glass or the plastic substrate is used, it is also possible to form the V groove by transferring the shape of a mold through press molding. Moreover, a groove such as a slit for fixing the wavelength selecting filter or the mirror may be provided on the substrate.

The mirrors 121 to 124 are used for changing an optical path and correcting the shift of an optical axis which is generated depending on precision in the external shape of a component and the shift of an optical axis which is generated during passage through the components. Accordingly, it is preferable to use a mirror having a Gimbal mechanism or a mirror having an adjusting mechanism corresponding thereto. The mirror having the Gimbal mechanism can adjust an inclination by setting one point (usually a center) of the mirror to be a rotation center. It is suitable that a metal mirror such as aluminum or gold should be used for these mirrors 121 to 124 because of an excellence in a reflectance and a durability.

The optical module 100 can be manufactured in the following manner.

First of all, the substrate 130 having the V grooves 131 to 134 formed thereon is prepared. Next, the collimators 111 to 114 are provided and fixed onto the V grooves 131 to 134 provided on the substrate 130. At this time, the collimators 111 to 114 may be fixed temporarily or permanently. It is preferable that they should be bonded to the substrate 130 collectively and permanently later in order to shorten a time required for a curing process such as heat curing or UV curing.

When the collimators 111 to 114 are provided, two mirrors 121 and 123 are then provided between the collimators 111 and 113 to adjust positions and inclinations thereof in such a manner that a light is experimentally emitted from the collimator 111 for an input light and is coupled to the collimator 113 for a branched light. These two mirrors 121 and 123 have the function of adjusting the directions and inclinations thereof to convert an optical path three-dimensionally. Irrespective of the positional relationship of the collimator 113 for a branched light, therefore, a light emitted from the collimator 111 for an input light can be incident thereon and their optical coupling can be carried out at a low loss. In order to confirm the optical coupling of the collimator pair 111 and 113, a light source for generating a light having an optional wavelength is connected to the collimator 111 on the emitting side, and the amount of a light of the light source which is collimated and the amount of a light incident on the collimator 113 on the other side are monitored by an optical multimeter. Similarly, the mirrors 124 and 122 are provided between the two collimators 114 and 112 to adjust positions and inclinations thereof in such a manner that a light is emitted from the collimator 114 for an inserted light and proper optical coupling is carried out together with the collimator 112 for an output light.

Next, the wavelength selecting filter 115 is provided on almost the center of the substrate 130. The wavelength selecting filter 115 can change its own direction and inclination in the same manner as the mirrors 121 to 124. First of all, a light having a wavelength reflected by the wavelength selecting filter 115 is emitted from the collimator 111 for an input light. Then, the position and inclination of the wavelength selecting filter 115 is adjusted in such a manner that a light emitted from the collimator 111 for an input light is reflected by the mirror 121 and is incident on the wavelength selecting filter 115 and a light reflected by the wavelength selecting filter 115 is further reflected by the mirror 122 and is incident on the collimator 112 for an output light.

Subsequently, a light having a transmission wavelength of the wavelength selecting filter 115 is emitted from the collimator 111 for an input light. Then, the shift of an optical axis generated by a transmission through the wavelength selecting filter 115 is adjusted by the mirror 123 provided between the wavelength selecting filter 115 and the collimator 113 for a branched light. Moreover, the light having a transmission wavelength of the wavelength selecting filter 115 is emitted from the collimator 114 for an inserted light and a light transmitted through the wavelength selecting filter 115 is adjusted by the mirror 124 provided between the collimator 114 for an inserted light and the wavelength selecting filter 115 to be optically coupled to the collimator 112 for an output light.

By adjusting the mirrors 121 to 124 as described above, it is possible to cause the optical paths between all the components to be coincident with each other. Thus, it is possible to fabricate the optical module 100 having the function of branching and coupling a light corresponding to the wavelength selecting characteristic of the wavelength selecting filter 115 (=the light branching and inserting function). According to the optical module 100 fabricated actually, optical coupling can be carried out at a coupling loss which is less than 0.2 dB between the collimators. It is preferable that each component provided on the substrate 130 should be fixed onto the substrate 130 after the adjustment of the optical axis. If the mirrors 121 to 124 are not moved in usual use, the inclinations thereof may be finely adjusted later without fixation.

Next, the action of the optical module 100 having the structure will be described.

First of all, a wavelength multiplexing light (including lights having wavelengths $\lambda 1$ to $\lambda n$) supplied from a light transmission path for input is emitted as a parallel light from the collimator 111 for an input light. The wavelength multiplexing light thus emitted is incident on the surface side of the wavelength selecting filter 115 through the mirror 121, and only a light having a specific wavelength (assumed to be the wavelength λ1) is transmitted through the wavelength selecting filter 115 and lights having other wavelengths (the wavelengths λ2 to λn) are reflected by the wavelength selecting filter 115 depending on the wavelength selectivity of the wavelength selecting filter 115.

The light having the wavelength λ1 which is transmitted through the wavelength selecting filter 115 is incident on the collimator 113 for a branched light through the mirror 123 and is transmitted to the outside. On the other hand, the light having the wavelength λ1 which is input from the outside is emitted as a parallel light by the collimator 114 for an inserted light. The light emitted from the collimator 114 for an inserted light is incident on the back side of the wavelength selecting filter 115 through the mirror 124 and is transmitted therethrough, and furthermore, is coupled to the lights having the wavelengths λ2 to λn reflected by the wavelength selecting filter 115 to produce a wavelength multiplexing light including the wavelengths λ1 to λn, and the wavelength multiplexing light is incident on the collimator 112 for an output light through the mirror 122 and is transmitted to a light transmission path for output. For the wavelength multiplexing light thus input, a signal light having a specific wavelength is branched and inserted into the outside.

According to the optical module 100, the collimators 111 to 114 are used in the input/output portion of a light to spatially propagate the light between the components. Therefore, it is not necessary to connect the components through an optical fiber. Consequently, manufacture can easily be carried out and the size of the apparatus can be reduced, and furthermore, the components can be replaced readily when they are defective. Moreover, only one wavelength selecting filter 115 is used in a branching and inserting process for one wavelength. Therefore, the number of expensive filters can be decreased so that a manufacturing cost can be reduced.

Furthermore, the shifts of the optical axis between the collimators 111 and 113 and the collimators 114 and 112 are corrected by means of the mirrors 121 to 124 provided between the wavelength selecting filter 115 and the collimators 111 to 114. By adjusting the mirrors 121 to 124, consequently, it is possible to carry out a light branching and inserting process in which sufficient optical coupling can be obtained and a loss can be reduced. Moreover, the collimators 111 to 114, the wavelength selecting filter 115 and the mirrors 121 to 124 are provided on the same substrate 130 and a light is spatially propagated between the components. Consequently, unnecessary components are not used and the price and size of the optical module 100 can be reduced in a minimum volume. Since the collimators 111 to 114 are fixed onto the V grooves 131 to 134 formed on the substrate 130 in parallel with each other, particularly, assembly can easily be carried out.

While the case in which the wavelength selecting filter 115 is used as an interference filter has been described in the embodiment, it is also possible to use an interference filter having other filter characteristics, for example, a gain equivalent filter for flattening and correcting the light intensity of an original signal when the light intensity is not uniform for a wavelength or a filter for taking out only one part of the amount of an incident light.

Next, a second embodiment of the invention will be described.

Figure 2A:
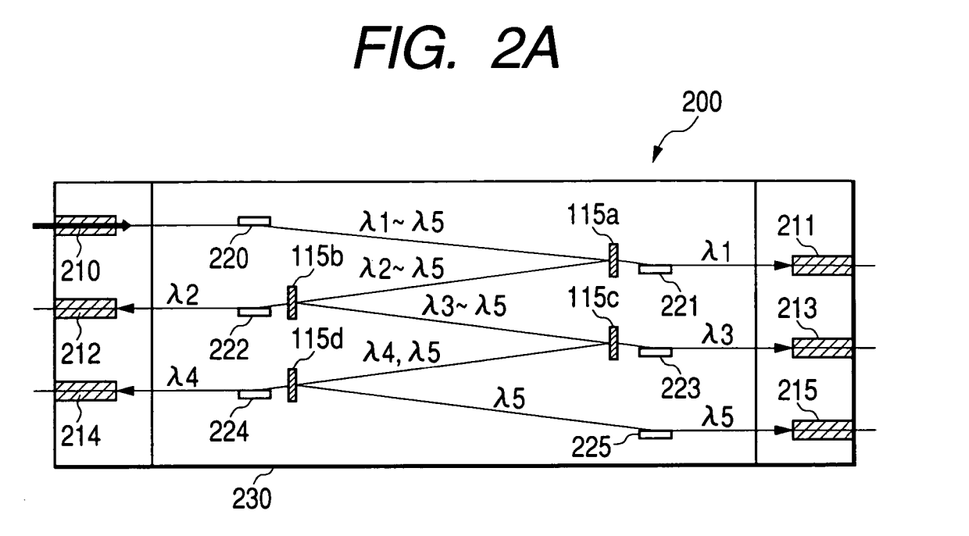
FIGS. 2(a) and 2(b) show the plan views showing an optical module according to a second embodiment of the invention: (a) being an explanatory view showing the case in which the optical module is used as an optical branching device; (b) being an explanatory view showing the case in which the optical module is used as an optical coupling device.
Figure 2B:
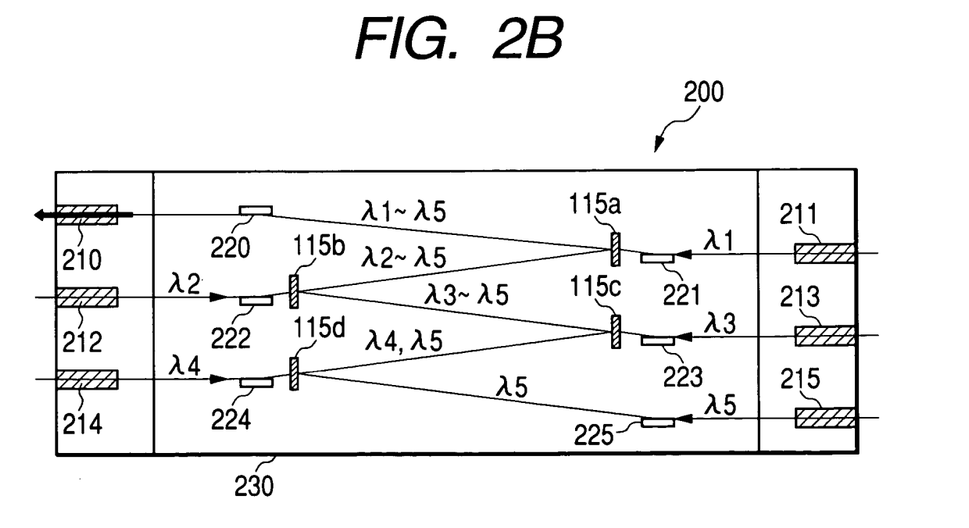

FIG. 2 is a plan view showing an optical module 200 according to the second embodiment of the invention. (a) shows, in an arrow, a direction of incidence/emission of a light when the optical module 200 is used as an optical branching device and (b) shows, in an arrow, a direction of incidence/emission of a light when the optical module 200 is used as an optical coupling device.

The optical module 200 comprises a plurality of collimators 210 to 215, a plurality of wavelength selecting filters 115a to 115d and a plurality of mirrors 220 to 225 provided and fixed onto a common substrate 230. Each of these elements has the same function as that described in the first embodiment. For example, the wavelength selecting filters 115a to 115d have a branching function of transmitting only a light having a specific wavelength in incident lights and reflecting lights having other wavelengths and a coupling function of coupling a light having a specific wavelength which is incident from one side and is transmitted and a light having another wavelength which is incident from the other side and is reflected.

There are provided the wavelength selecting filters 115a to 115d having specific wavelengths varied. The first wavelength selecting filter 115a has such a characteristic as to transmit a light having a specific wavelength λ1, the second wavelength selecting filter 115b has such a characteristic as to transmit a light having a specific wavelength λ2, the third wavelength selecting filter 115c has such a characteristic as to transmit a light having a specific wavelength λ3, and the fourth wavelength selecting filter 115d has such a characteristic as to transmit a light having a specific wavelength λ4.

These wavelength selecting filters 115a to 115d are provided in such a manner that the lights reflected by them are incident in order from the upstream side toward the downstream side in the direction of the advance of the light. Based on the case of utilization as the optical branching device in (a), the wavelength selecting filters 115a to 115d are provided in this order in such a manner that the lights reflected by them are incident in order from the upstream side toward the downstream side in the direction of the advance of the light. More specifically, each of the filters is provided to have such a positional relationship that the first and third wavelength selecting filters 115a and 115c and the second and fourth wavelength selecting filters 115b and 115d are obliquely opposed to each other and such a positional relationship that the first and third wavelength selecting filters 115a and 115c and the second and fourth wavelength selecting filters 115b and 115d are adjacent to each other.

A collimator 210 for input and output is provided on an optical path for an incident light on the wavelength selecting filter 115a at the most upstream, first to fifth collimators 211 to 215 for branching and insertion are provided on an optical path for the light transmitted through each of the wavelength selecting filters 115a to 115d and an optical path for the reflected light of the wavelength selecting filter 115d on the most downstream, and furthermore, mirrors 220 to 225 for correcting an optical path are provided on optical paths between the collimators 210 to 215 and the wavelength selecting filters 115a to 115d respectively. The collimator 210 for input and output and the second and fourth collimators 212 and 214 are provided in this order along one of the short sides of the substrate 230 having a rectangular shape, and the first, third and fifth collimators 211, 213 and 215 are provided in this order along the other short side of the substrate 230.

The mirrors 221 to 225 adjust an optical path in such a manner that a light advances in the following manner. First of all, a light emitted from the collimator 211 for input and output is incident on the first wavelength selecting filter 115a and the light transmitted therethrough is incident on the first collimator 210 for branching and insertion. Moreover, a light reflected by the first wavelength selecting filter 115a is incident on the second wavelength selecting filter 115b and the light transmitted therethrough is incident on the second collimator 212 for branching and insertion. Furthermore, a light reflected by the second wavelength selecting filter 115b is incident on the third wavelength selecting filter 115c and the light transmitted therethrough is incident on the third collimator 213 for branching and insertion. In addition, a light reflected by the third wavelength selecting filter 115c is incident on the fourth wavelength selecting filter 115d and the light transmitted therethrough is incident on the fourth collimator 214 for branching and insertion. A light reflected by the fourth wavelength selecting filter 115d is incident on the fifth collimator 215 for branching and insertion.

The optical module 200 can be manufactured in the following manner.

First of all, the substrate 230 having a V groove (not shown) formed thereon is prepared. Next, each of the collimators 210 to 215 is provided and fixed onto the V groove formed on the substrate 230. A work to be carried out for the fixation and the confirmation of optical coupling are the same as those in the first embodiment.

Subsequently, two mirrors 220 and 221 are provided between the collimators 210 and 211 to adjust positions, directions and inclinations thereof in such a manner that a light having an optional wavelength is emitted from the collimator 210 for input and output and is coupled to the first collimator 211 for branching and insertion. The two mirrors 220 and 221 provided between the collimators 210 and 211 have the function of adjusting the directions and inclinations thereof, thereby converting an optical path three-dimensionally. Irrespective of the positional relationship between a pair of collimators 210 and 211, their optical coupling can be carried out at a low loss.

Then, the first wavelength selecting filter 115a is provided in a position between the two mirrors 220 and 221 in which a light emitted from the collimator 210 for input and output strikes. The first wavelength selecting filter 115a has a function capable of varying its own direction and inclination in the same manner as the mirrors 220 and 221. Moreover, the mirror 222 is provided in such a manner that a light emitted from the collimator 210 for input and output and reflected by the first wavelength selecting filter 115a is input to the second collimator 212 for branching and insertion. More specifically, the positions, directions and inclinations of the first wavelength selecting filter 115a and the mirror 222 are adjusted in such a manner that a light having a wavelength (a wavelength other than $\lambda 1$) to be reflected by the first wavelength selecting filter 115a is emitted from the collimator 210 for input and output and is properly incident on the second collimator 212 for branching and insertion.

Although the first wavelength selecting filter 115a is inserted so that the optical axis of incidence on the first collimator 211 for branching and insertion is shifted, correction can easily be carried out later by finely adjusting the direction and inclination of the mirror 221 in such a manner that a light having a transmission wavelength ($\lambda 1$) of the first wavelength selecting filter 115a is emitted from the collimator 210 for input and output and the light transmitted through the filter 115a is properly incident on the first collimator 211 for branching and insertion. Accordingly, it is possible to obtain optical coupling which is equivalent to that acquired before the insertion of the filter.

Next, the second wavelength selecting filter 115b is provided in a position between the first wavelength selecting filter 115a and the mirror 222 in which a light emitted from the collimator 210 for input and output (a light reflected by the wavelength selecting filter 115a) strikes. In the same manner as the mirror, the second wavelength selecting filter 115b also has a function capable of varying its own direction and inclination. Moreover, the mirror 223 is provided in such a manner that a light emitted from the collimator 210 for input and output and reflected sequentially by the first and second wavelength selecting filters 115a and 115b is input to the third collimator 213 for branching and insertion. More specifically, the positions, directions and inclinations of the second wavelength selecting filter 115b and the mirror 223 are adjusted in such a manner that a light having a wavelength (a wavelength other than $\lambda 1$ and $\lambda 2$) to be reflected by the first and second wavelength selecting filters 115a and 115b is emitted from the collimator 210 for input and output and is properly incident on the third collimator 213 for branching and insertion.

Also in this case, although the second wavelength selecting filter 115b is inserted so that the optical axis of incidence on the second collimator 212 for branching and insertion is shifted, correction can easily be carried out later by finely adjusting the direction and inclination of the mirror 222 in such a manner that a light having a transmission wavelength ($\lambda 2$) of the second wavelength selecting filter 115b is emitted from the collimator 210 for input and output and the light transmitted through the filter 115b is properly incident on the second collimator 212 for branching and insertion. Accordingly, it is possible to obtain optical coupling which is equivalent to that acquired before the insertion of the filter.

Subsequently, the third wavelength selecting filter 115c is provided in a position between the second wavelength selecting filter 115b and the mirror 223 in which a light emitted from the collimator 210 for input and output (a light reflected by the wavelength selecting filters 115a and 115b) strikes. In the same manner as the mirror, the third wavelength selecting filter 115c also has a function capable of varying its own direction and inclination. Moreover, the mirror 224 is provided in such a manner that a light emitted from the collimator 210 for input and output and reflected sequentially by the first, second and third wavelength selecting filters 115a, 115b and 115c is input to the fourth collimator 214 for branching and insertion. More specifically, the positions, directions and inclinations of the third wavelength selecting filter 115c and the mirror 224 are adjusted in such a manner that a light having a wavelength (a wavelength other than $\lambda 1$, $\lambda 2$ and $\lambda 3$) to be reflected by the first, second and third wavelength selecting filters 115a, 115b and 115c is emitted from the collimator 210 for input and output and is properly incident on the fourth collimator 214 for branching and insertion.

Also in this case, although the third wavelength selecting filter 115c is inserted so that the optical axis of incidence on the third collimator 213 for branching and insertion is shifted, correction can easily be carried out later by finely adjusting the direction and inclination of the mirror 223 in such a manner that a light having a transmission wavelength ($\lambda 3$) of the third wavelength selecting filter 115c is emitted from the collimator 210 for input and output and the light transmitted through the filter 115c is properly incident on the third collimator 213 for branching and insertion. Accordingly, it is possible to obtain optical coupling which is equivalent to that acquired before the insertion of the filter.

Then, the fourth wavelength selecting filter 115d is provided in a position between the third wavelength selecting filter 115c and the mirror 224 in which a light emitted from the collimator 210 for input and output (a light reflected by the wavelength selecting filters 115a, 115b and 115c) strikes. In the same manner as the mirror, the fourth wavelength selecting filter 115d also has a function capable of varying its own direction and inclination. Moreover, the mirror 225 is provided in such a manner that a light emitted from the collimator 210 for input and output and reflected sequentially by the first, second, third and fourth wavelength selecting filters 115a, 115b, 115c and 115d is input to the fifth collimator 215 for branching and insertion. More specifically, the positions, directions and inclinations of the fourth wavelength selecting filter 115d and the mirror 225 are adjusted in such a manner that a light having a wavelength (a wavelength other than $\lambda 1$, $\lambda 2$, $\lambda 3$ and $\lambda 4$) to be reflected by the first, second, third and fourth wavelength selecting filters 115a, 115b, 115c and 115d is emitted from the collimator 210 for input and output and is properly incident on the fifth collimator 215 for branching and insertion.

Also in this case, although the fourth wavelength selecting filter 115d is inserted so that the optical axis of incidence on the fourth collimator 214 for branching and insertion is shifted, correction can easily be carried out later by finely adjusting the direction and inclination of the mirror 224 in such a manner that a light having a transmission wavelength ($\lambda 4$) of the fourth wavelength selecting filter 115d is emitted from the collimator 210 for input and output and the light transmitted through the filter 115d is properly incident on the fourth collimator 214 for branching and insertion. Accordingly, it is possible to obtain optical coupling which is equivalent to that acquired before the insertion of the filter.

Next, description will be given to the case in which the optical module 200 is used as a plural wavelength optical branching device. In the case in which the optical module 200 is used as the optical branching device, as shown in FIG. 2(a), the collimator 210 for input and output is set to be a collimator for input which receives a wavelength multiplexing light emitted from an external light transmission path for input and the other collimators 211 to 215 are set to be collimators for a branched light which take a light transmitted or reflected by the wavelength selecting filters 115a to 115d to the outside, and the wavelength selecting filters 115a to 115d are utilized as optical units for branching. Thus, the function of sequentially branching the waveform multiplexing light can be exhibited.

In the case in which the wavelength multiplexing light having the wavelengths $\lambda 1$ to $\lambda 5$ is input to the collimator 210 for input and output, only the light having the wavelength $\lambda 1$ is transmitted through the first wavelength selecting filter 115a and is incident on the first collimator 211 for branching and insertion, and the other lights having the wavelengths $\lambda 2$ to $\lambda 5$ are reflected toward the second wavelength selecting filter 115b. In the second wavelength selecting filter 115b, similarly, only the light having the wavelength $\lambda 2$ is transmitted and incident on the second collimator 212 for branching and insertion, and the other lights having the wavelengths $\lambda 3$ to $\lambda 5$ are reflected toward the third wavelength selecting filter 115c. In the third wavelength selecting filter 115c, moreover, only the light having the wavelength $\lambda 3$ is transmitted and incident on the third collimator 213 for branching and insertion, and the other lights having the wavelengths $\lambda 4$ and $\lambda 5$ are reflected toward the fourth wavelength selecting filter 115d. In the fourth wavelength selecting filter 115d, only the light having the wavelength $\lambda 4$ is transmitted and incident on the fourth collimator 214 for branching and insertion, and the other light having the wavelength $\lambda 5$ is reflected toward the fifth collimator 215 for branching and insertion. Consequently, a light having each wavelength is branched sequentially.

Subsequently, description will be given to the case in which the optical module 200 is used as a plural wavelength optical coupling device. In the case in which the optical module 200 is used as an optical coupling device, as shown in FIG. 2(b), the collimator 210 for input and output is set to be a collimator for an output light which serves to transmit an output light to an external light transmission path for output and the other collimators 211 to 215 are set to be collimators for an inserted light which cause lights having different wavelengths to be incident on the wavelength selecting filters 115a to 115d from the outside, and the wavelength selecting filters 115a to 115d are utilized as optical units for coupling. Thus, the function of sequentially coupling the lights having different wavelengths is exhibited.

In the case in which the lights having the wavelengths $\lambda 1$ to $\lambda 5$ are sequentially input to the collimators 211 to 215 for branching and insertion, the lights having the wavelengths $\lambda 5$ and $\lambda 4$ are coupled in the fourth wavelength selecting filter 115d, the lights having the wavelengths $\lambda 5$ to $\lambda 3$ are coupled in the third wavelength selecting filter 115c, the lights having the wavelengths $\lambda 5$ to $\lambda 2$ are coupled in the second wavelength selecting filter 115b, and the lights having the wavelengths $\lambda 5$ to $\lambda 1$ are coupled in the first wavelength selecting filter 115a. Then, the light emitted from the first wavelength selecting filter 115a is incident on the collimator 210 for input and output and is transmitted to the external light transmission path.

As described above, the optical module 200 according to the embodiment can also be used as both the optical branching device and the optical coupling device. In that case, in addition, the shift of the optical axis which is generated in passage through each component is corrected by the mirrors 220 to 225 provided between the wavelength selecting filters 115a to 115d and the collimators 210 to 215. Therefore, sufficient optical coupling can be obtained and a light branching process or a light coupling process can be carried out at a low loss. In the optical module 200, moreover, each of the components is provided on the substrate 230 and a light is spatially propagated between the components. As compared with an optical branching device or an optical coupling device of such a type as to connect a plurality of filter modules through an optical fiber by using the filter modules according to the conventional art, therefore, it is possible to obtain an optical branching device or an optical coupling device which has a lower loss, a smaller size and a lower price. In particular, the optical module according to the embodiment can be more advantageous if the number of channels is increased.

[0077-2]

A third embodiment. Also in the case in which the mirror used as the component for correcting an optical path is replaced with a prism in the first and second embodiments of the invention, the same advantages can be produced as shown in optical modules 300, 400, 500 and 600. In the optical modules 300 and 400, a total reflection prism is used as the prism so that an optical path for a signal light can be corrected in the same manner as the mirror. In the optical modules 500 and 600, moreover, a wedge-shaped prism having an optional angle is used as the prism to utilize an angle of refraction of the signal light so that an optical path can be corrected. In both the total reflection type prism and the wedge-shaped prism, if an antireflection coating is provided on a transmitting surface, the same performance as that of a reflecting mirror can be obtained. In case of the wedge-shaped prism, particularly, a beam generated by low angle reflection is not enlarged. Therefore, the size of the prism itself can be reduced. Consequently, it is also possible to produce such an advantage that a whole size can be reduced.

The arrangement of the components such as each collimator, a mirror, a prism and a wavelength selecting filter is not restricted to that in each of the embodiments but they may be provided in other ways if a necessary optical path can be formed. While the wavelength selecting filter is used as the interference filter in the embodiments, moreover, an interference filter having another function may be used. If necessary, furthermore, other optical components, for example, a polarizing unit and a lens may be provided on the same substrate in addition to the collimator, the mirror, the prism and the filter.

ADVANTAGES OF THE INVENTION

As described above, according to the invention, a mirror for correcting an optical path is provided on the optical path between a collimator and an interference filter and the shift of an optical axis between the collimators is corrected by means of the mirror or prism. Therefore, it is possible to implement excellent optical coupling. Moreover, each component is fixed onto a common substrate and a light is spatially propagated between the components. Consequently, unnecessary components are not used and the price and size of an optical module can be reduced in a minimum volume. According to the third aspect of the invention, moreover, it is possible to implement a light branching and inserting apparatus having a low loss by carrying out excellent optical coupling. According to the fourth aspect of the invention, furthermore, it is possible to fabricate a plural wavelength optical branching device (the fifth aspect of the invention) and a plural wavelength optical coupling device (the sixth aspect of the invention) at a low loss.

What is claimed is:

1. An optical module comprising: a common substrate, a collimator for an input light on said substrate, which collimates a light input from an outside location, a collimator for an output light on said substrate, which collects an incident light to be output to the outside location and transmits the light to the outside location, an interference filter provided on an optical path from the collimator for an input light to the collimator for an output light, and a mirror or prism on said substrate for correcting an optical path which is provided between the interference filter and each
of the collimators,
wherein each of the collimators is provided on a V groove formed on the common substrate in parallel,
wherein each of the V grooves is in parallel and orthogonal to a linear side edge of said substrate, and
wherein each of the collimators is constituted by an optical fiber and a collimate lens provided on an emitting or incident end of the optical fiber, and for at least one collimator, both the optical fiber and the collimate lens are provided on the same V groove.

2. The optical module according to claim 1, wherein at least any of:
(a) a wavelength selecting filter for transmitting only light in a specific wavelength band in incident light and reflecting light having other wavelengths is used as the interference filter;

(b) a gain equivalent filter for correcting a light intensity to flatten an intensity of an incident light if the intensity is not uniform for a wavelength is used as the interference filter; and
(c) a filter for taking out only a part of an amount of the incident light is used as the interference filter.

3. An optical module comprising a first input collimator which collimates a wavelength multiplexing light signal transmitted from a light transmission path into a parallel light signal, a wavelength selecting filter for transmitting only a light signal in a specific wavelength band in the wavelength multiplexing light signal incident through the first input collimator and reflecting light signals in other wavelength bands, a first output collimator which collects light signals transmitted through the wavelength selecting filter and transmits the light signal to an external light transmission path for branching the light signal, a second input collimator which collimates a light signal in a specific wavelength band transmitted from an external light transmission path for insertion into a parallel light signal and causes the light signal to be incident on the wavelength selecting filter, a second output collimator which collects a synthesized light signal of a light signal incident on and transmitted through the wavelength selecting filter by the second input collimator and any of the wavelength multiplexing light signal reflected by the wavelength selecting filter and transmits the collected light signal to an external light transmission path for an output, and a mirror or prism for correcting an optical path which is provided on an optical path between at least one of the first input collimator, the second input collimator, the first output collimator and the second output collimator and the wavelength selecting filter, wherein each of the collimators, the wavelength selecting filter and the minor for correcting an optical path are provided on a common substrate,
wherein each of the collimators is provided on a V groove formed on the common substrate in parallel,
wherein each of the V grooves is in parallel and orthogonal to a linear side edge of said substrate, and
wherein each of the collimators is constituted by an optical fiber and a collimate lens provided on an emitting or incident end of the optical fiber.

4. An optical module comprising: a plurality of collimators and a plurality of wavelength selecting filters having a branching function of transmitting only a light signal having a specific wavelength from an incident light signal and reflecting light signals having other wavelengths and a coupling function for coupling a light signal having a specific wavelength which is incident from a first side of the module and a light signal having another wavelength, which is incident from a second side of the module, is provided with the specific wavelength varied,
the wavelength selecting filters are provided in such a manner that a light signal reflected by a filter is directed in order from an upstream side of the module toward a downstream side of the module in a direction of transmission of the light signal,
at least a first collimator is provided on an optical path for a light signal incident on a wavelength selecting filter at a most upstream location, at least a second collimator is provided on an optical path for a light signal transmitted through each of the wavelength selecting filters and at least a third collimator is provided on an optical path for a light signal reflected by the wavelength selecting filter at a most downstream location, respectively, a mirror or prism for correcting an optical path is provided on an optical path between each of said first collimator, said second collimator and said third collimator, respectively, and the wavelength selecting filter, and the plurality of collimators, the wavelength selecting filter and the minor or prism for correcting an optical path are provided on a common substrate, wherein each of the plurality of collimators is provided on a V groove formed on the common substrate in parallel, wherein each of the V grooves is in parallel and orthogonal to a linear side edge of said substrate, and wherein each of the plurality of collimators is constituted by an optical fiber and a collimate lens provided on an emitting or incident end of the optical fiber.

5. The optical module according to claim 4, wherein the first collimator provided on the most upstream location is set to be a collimator for an input light signal which receives a wavelength multiplexing light signals from an external light transmission path for input, the other collimators are set to be collimators for a branched light signals which take out a light signal transmitted through or reflected by the wavelength selecting filter to an outside location, and the wavelength selecting filter is utilized as an optical unit for branching, thereby constituting a plural wavelength optical branching device for sequentially branching the wavelength multiplexing light signal.

6. The optical module according to claim 4, wherein the third collimator provided on the most downstream location is set to be a collimator for an output light signal which transmits an output light signal to an external light transmission path for output, the other collimators are set to be collimators for an inserted light signal which cause light signals having different wavelengths to be incident on the wavelength selecting filter from an outside location, and the wavelength selecting filter is utilized as an optical unit for coupling, thereby constituting a plural wavelength optical coupling device for sequentially coupling light signals having different wavelengths.

* * * * *